US006588418B1

United States Patent
Loving

(10) Patent No.: US 6,588,418 B1
(45) Date of Patent: Jul. 8, 2003

(54) TRANSPORTABLE, EXTENDABLE/ RETRACTABLE BARBEQUE GRILL

(76) Inventor: Christopher B. Loving, 115 Bonami Ct., Fairburn, GA (US) 30213

( * ) Notice: Subject to any disclaimer, the term of this patent is extended or adjusted under 35 U.S.C. 154(b) by 0 days.

(21) Appl. No.: 10/219,491

(22) Filed: Aug. 16, 2002

(51) Int. Cl.[7] .................................................. F24C 1/16
(52) U.S. Cl. ...................... 126/276; 126/41 R; 126/9 R
(58) Field of Search ................................ 126/276, 41 R, 126/9 R, 25 R, 26, 40, 30; 108/44; 224/119, 519; 248/231.21, 352; 280/502

(56) References Cited

U.S. PATENT DOCUMENTS

| 4,757,756 | A | | 7/1988 | Van Marr | ..................... 99/482 |
| 5,626,126 | A | * | 5/1997 | McNulty | ..................... 126/276 |
| 5,640,949 | A | | 6/1997 | Smith | ..................... 126/276 |
| 5,950,617 | A | * | 9/1999 | Lorenz | ..................... 126/276 |
| 6,058,832 | A | | 5/2000 | Fountain | ..................... 99/446 |
| 6,189,458 | B1 | | 2/2001 | Rivera | ..................... 108/44 |
| 6,354,286 | B1 | * | 3/2002 | Davis | ..................... 126/276 |
| 2001/0042545 | A1 | * | 11/2001 | Robin | |
| 2002/0148940 | A1 | * | 10/2002 | Lee | |

* cited by examiner

*Primary Examiner*—Alfred Basichas
(74) *Attorney, Agent, or Firm*—Jerome J. Norris

(57) ABSTRACT

A vehicular trailer hitch, transportable, extendable/ retractable barbecue grill for cooking while still connected to a towing vehicle, including clamping member for attachment to a trailer hitch of a vehicle, a principle arm member to provide support for the barbecue grill having a first link to which the clamping member is fixed, the principle arm further comprising additional links hingedly attached to the first link to permit retraction of the principle arm from an extended position into a folded position insertable in a stabilizing sleeve, a universal coupling member connecting at least the first link of the principle arm to allow for arm misalignment and act as a shock absorber for transportation vibrations and jerks, and a distal end fixedly attached to a last link of the principle and secondary arms of the barbecue grill.

12 Claims, 7 Drawing Sheets

TRANSPORTABLE, EXTENDABLE/RETRACTABLE BARBEQUE GRILL

BACKGROUND OF THE INVENTION

1. Field of the Invention

The invention relates to a transportable, extendable/retractable barbeque grill mountable via a connection to a vehicle to enable the barbeque grill to trail behind the vehicle in a suspended manner above the road. The extendable/retractable connection comprises an attachable tripod connection to a locking roller to enable the suspended, extendable/retractable connection to rest on the ground when in use for barbeque grilling.

2. Description of Prior Art

Despite the fact that the preparation of foods by cooking or smoking over an open flame is well known, cooking and food preparation has progressed substantially in that various and sundry means have been utilized to make cooking and smoking over an open flame more easily accessible or convenient for families or campers.

In this connection, among the means that progress has taken are those to facilitate transportation to enable camping or cookouts for families seeking recreation to become easier. These easier means entail eliminating the need for families or campers to carry bulky and space consuming cooking and camping equipment, inclusive of automobile transportation means to facilitate outdoor barbeque grilling.

A collapsible table holder for attachment to a trailer hitch of a motor vehicle is disclosed in U.S. Pat. No. 6,189,458 B1. The combination of this attachment comprises:

a collapsible holder coupled to a trailer hitch of a vehicle, the collapsible holder having first, second and third arm members that extend in different directions and are pivotal relative to one another, the first arm member is coupled to the trailer hitch, the third arm member pivotally connected between the first and second arm member and the second arm member adapted to be rotated towards and into face-to-face alignment with the third arm member, and the third arm member adapted to be rotated towards and into face-to-face alignment with the first arm member to form a compact package with the second, third and first arm members arranged one above the other; and a table having a coupling sleeve attached thereto, the coupling sleeve to be coupled to the second arm member of the collapsible holder, whereby the table is adapted to be supported from the trailer hitch of the motor vehicle by way of the collapsible holder.

U.S. Pat. No. 6,058,832 disclose a portable barbeque grill comprising:

a base, the base having a front wall, rear wall, side walls, a bottom wall, and a top wall completely enclosing a hollow interior, the base configured as a truncated pyramid;

a firebox, the firebox having an interior defined by a rectangular vertically-oriented front wall, a rectangular vertically-oriented rear wall, rectangular vertically-oriented side walls, a rectangular horizontally-oriented bottom wall, and an open top, the firebox disposed upon the base such that the top wall of the base is the bottom wall of the firebox; and a cooking chamber, the cooking chamber positioned upon the firebox and having an open bottom in fluid communication with the open top of the firebox, the cooking chamber defined by a vertically extending front wall, a vertically extending rear wall, vertically extending side walls, and a top wall configured as a truncated pyramid.

A portable barbecue grill and table for mounting the same on a trailer is disclosed in U.S. Pat. No. 5,640,949. The barbecue grill apparatus comprises:

a principal supporting arm having a distal end adapted for attachment to a trailer hitch tube and extending horizontally away from a motor vehicle;

a barbecue grill; and means for mounting the barbecue grill on the principal supporting arm, wherein the mounting means further comprises an ash saucer fixed to a vertical portion of the principal supporting arm, the ash saucer comprising a plurality of grill fasteners therethrough and an aligned plurality of mounting sleeves on the barbecue grill, with each grill fastener penetrating one mounting sleeve.

U.S. Pat. No. 4,757,756 disclose a transportable outdoor barbecue grill. The grill apparatus comprises:

a firebox configured to contain a supply of combustibles which produce smoke and heat upon burning for purposes of cooking and smoke processing foods;

a first chamber mounted vertically above the firebox and communicating with the firebox, the first chamber configured to receive and retain foods whereby heat and smoke produced within the firebox are directed generally upward into the first chamber for direct cooking of the foods contained therein;

a second chamber having means to receive and retain foods, mounted substantially lateral of said firebox and communicating therewith, whereby smoke produced within the firebox is directed into the second chamber for smoke processing the foods contained therein and whereby heat produced within the firebox is generally not directed into the second chamber; and a humidifying means mounted in association with the second cooking chamber for producing moisture within the second cooking chamber during the smoke processing of foods therein; the humidifying means including an open-ended receptacle positioned within the second cooking chamber for containing a supply of liquid and a conduit means associated with the receptacle for receiving a supply of liquid from the receptacle, directing the liquid sufficiently proximate the firebox that heat from the firebox is absorbed by the liquid, and thereafter directing the heated liquid into the second chamber.

There is a need in the art of preparation of foods by cooking or smoking over an open flame to better facilitate transportation and ultimate use of a barbecue grill therefor by making the grill more easily transportable by a towing vehicle, and yet not requiring actual removal of the grill from the towing vehicle for barbecuing at the picnic or cook-out site.

SUMMARY OF THE INVENTION

One object of the present invention is to provide a transportable, extendable/retractable barbecue grill which is easily towable by a motor vehicle.

Another object of the present invention is to provide a transportable, extendable/retractable barbecue grill that is capable of being towed in a retracted form at a close distance behind the towing vehicle, but extendable for ultimate use on the cook-out turf, while still connected to the towing vehicle.

BRIEF DESCRIPTION OF THE DRAWING FIGURES

DETAILED DESCRIPTION OF PREFERRED EMBODIMENT OF THE INVENTION

Figure 1:
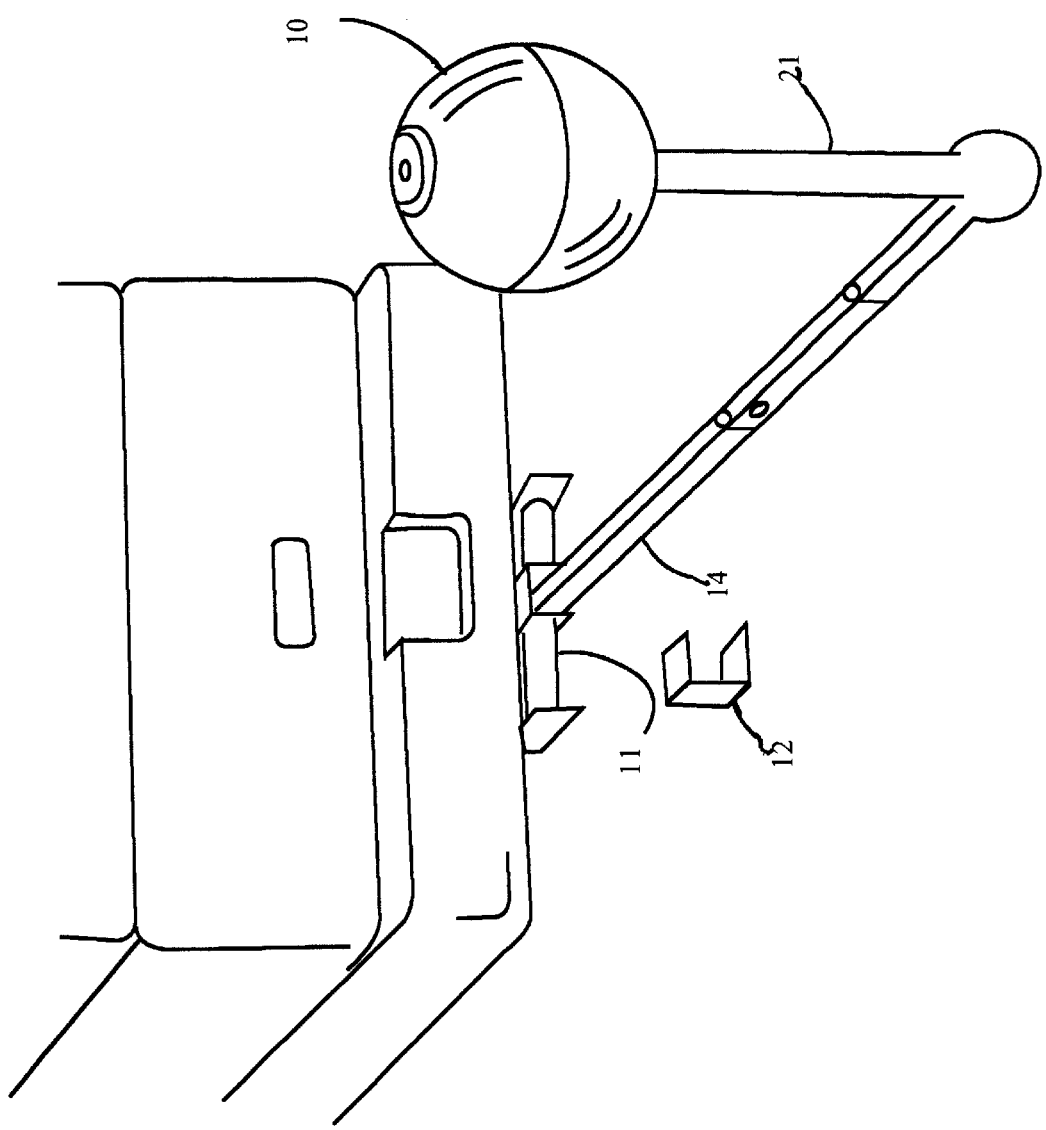
FIG. 1 depicts a view in perspective of the manner of attachment of the extendable/retractable barbecue grill to the trailer hitch of a vehicle in the extended form immediately prior to set-up on the base for grilling.

Reference is now made to FIG. 1 which shows a perspective view of the attachment of the extendable/retractable barbecue grill 10 to a trailer hitch 11 of a towing vehicle such as a sports utility van (SUV). In this view, the barbecue grill is suspended at the end of the principle support arm of the device in the unfolded or extendable position, after the removable sleeve 12 (that encloses the support arm in the folded or retracted form) has been removed.

Figure 2:
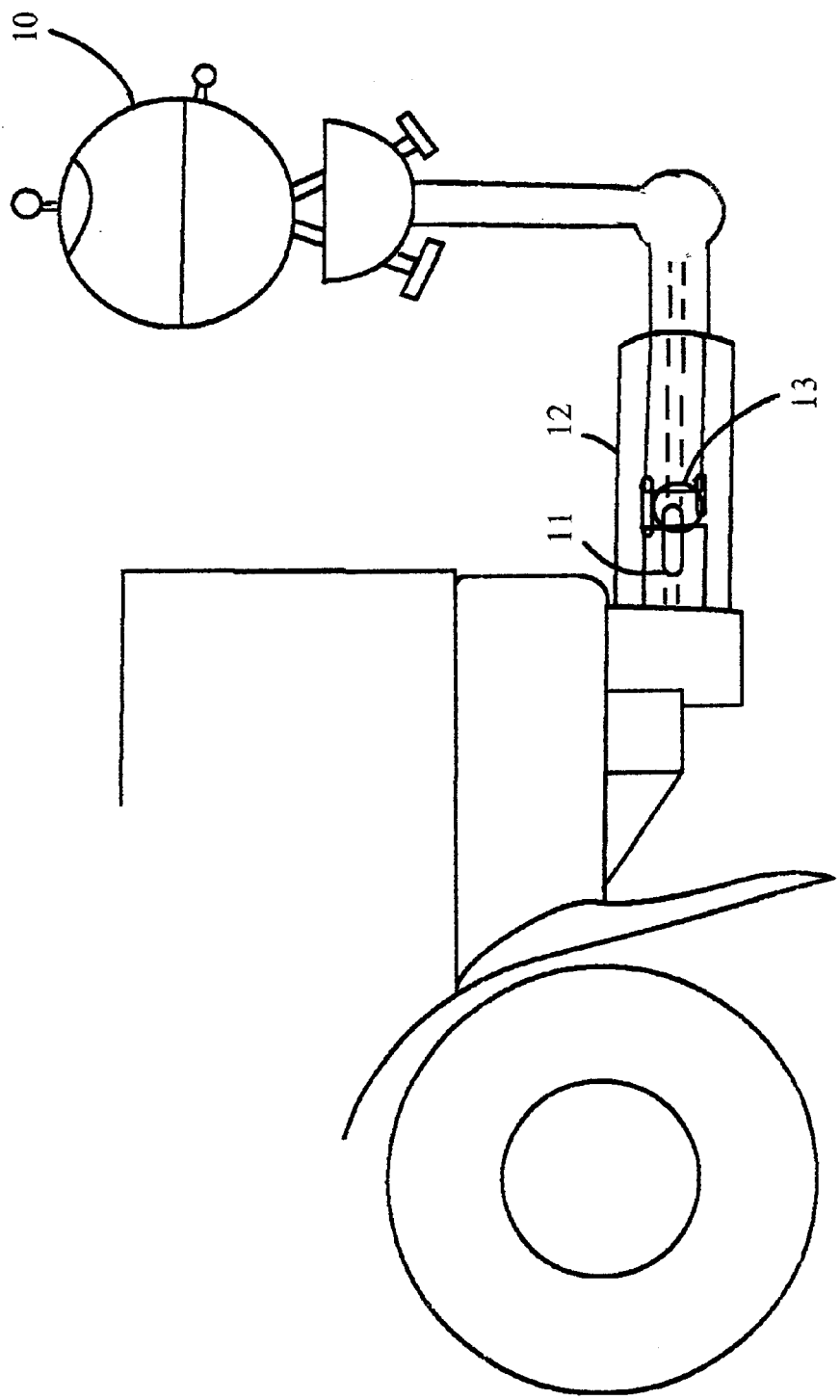
FIG. 2 is a sideview of the attachment component of the extendable/retractable barbecue grill to the trailer hitch in the retracted or folded form.

The removable sleeve 12, as shown in FIG. 2 (which is a side view of the attachment component of the extendable/retractable barbecue grill) restrains any tendency for the folded principle arm to move about freely in response to movement of the vehicle or rough or uneven points in the road during towing. A resilient clamp 13 locks around the trailer hitch 11 of the vehicle when the first link of the principle support arm 14 is pushed in a horizontal direction and forced into locking relationship with trailer hitch 11.

Figure 3A:
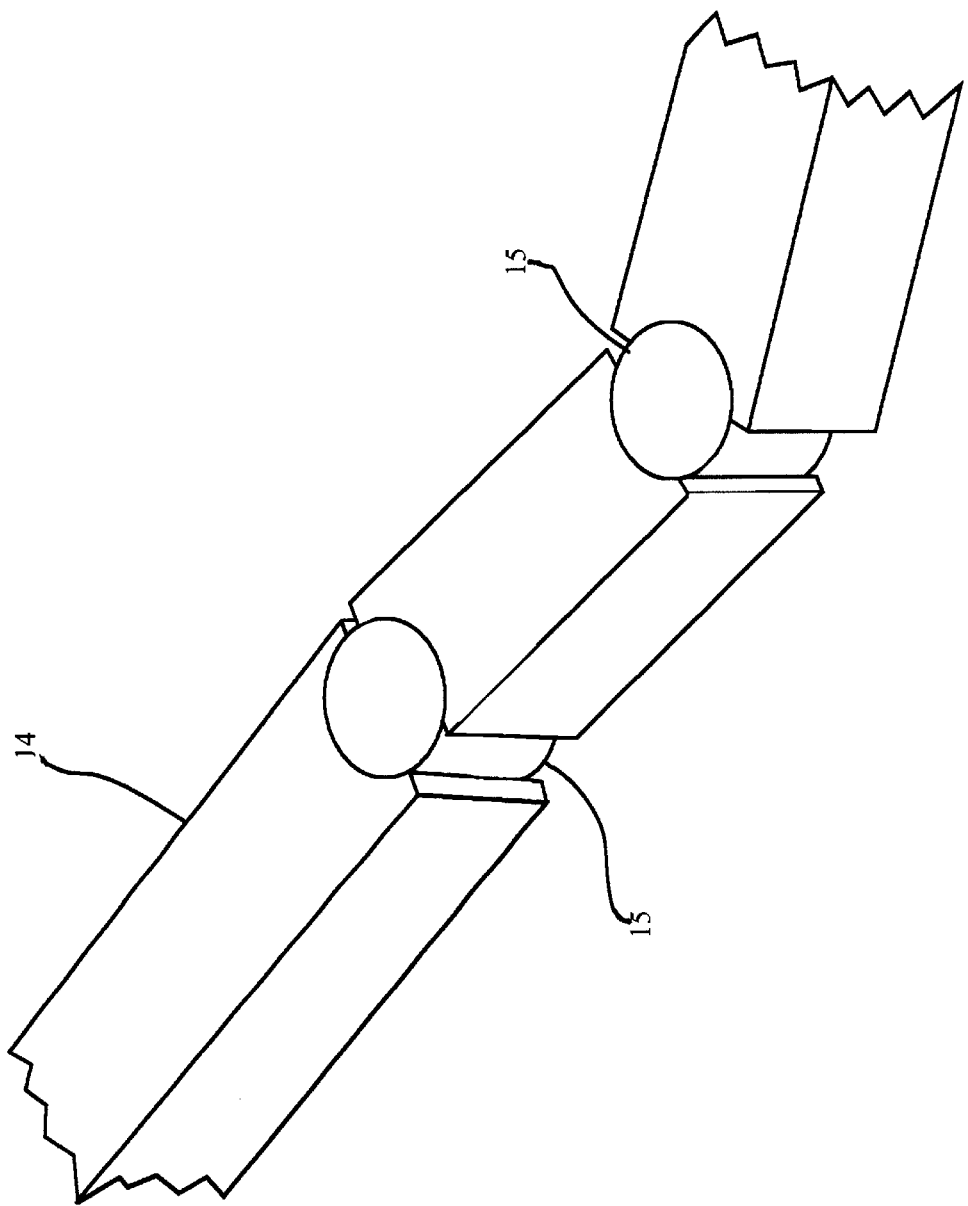
FIG. 3A is a view in section of the hinge arrangement of one embodiment of the extendable/retractable support arm of the barbecue grill.

The links of the extendable/retractable support arm 14 are hingedly attached to each other, as can be seen in FIG. 3A. In the embodiment of FIG. 3A, the hinge 15 is disposed interior to and in alignment with the support arm 14; however, in the embodiment of the support arm shown in FIG. 3B, hinges 16 are non-axially affixed to the support arm 14 of the extendable/retractable barbecue grill.

Figure 3B:
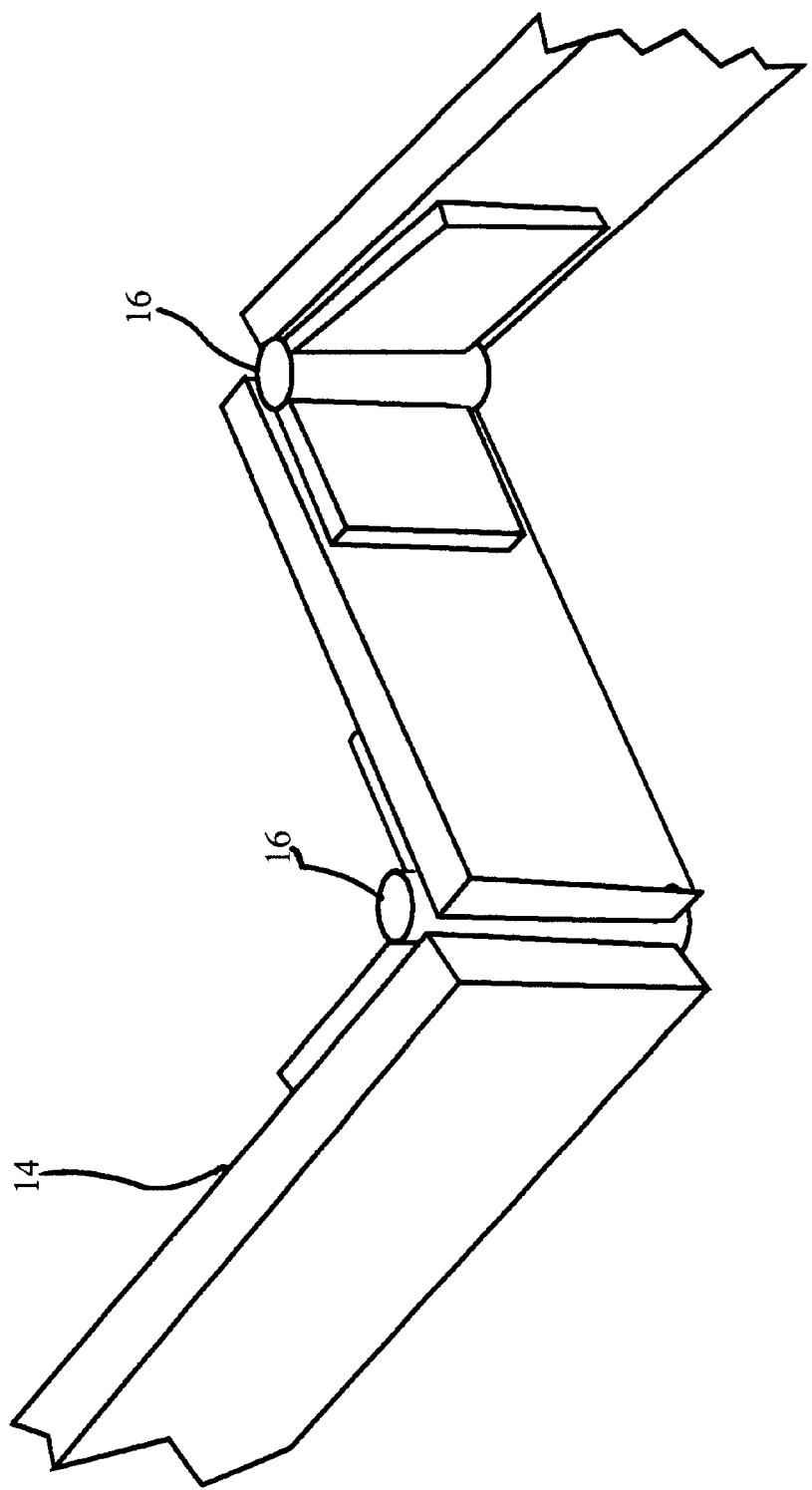
FIG. 3B is a view in section of the hinge arrangement of another embodiment of the extendable/retractable support arm of the barbecue grill.
Figure 4:
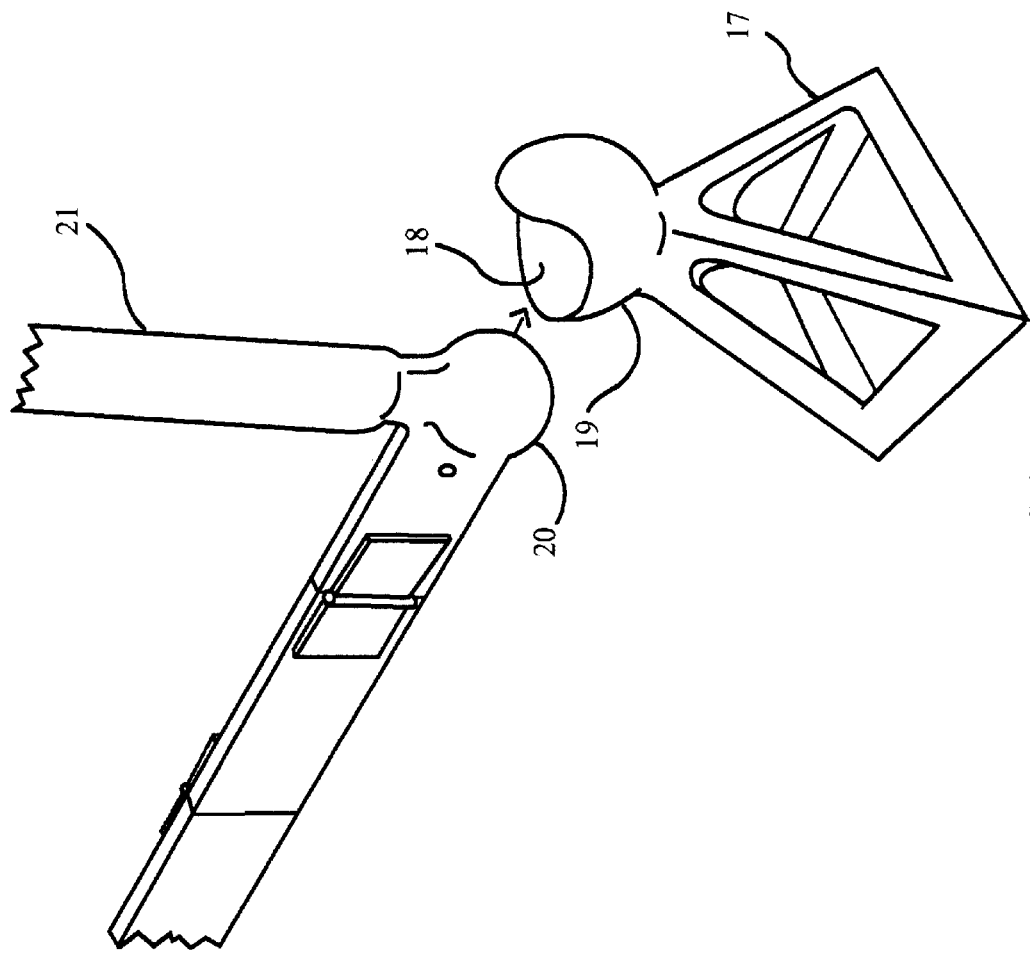
FIG. 4 is a view in perspective of the base or ground support into which the distal end of the support arm of the extendable/retractable barbecue grill rest in the base at the barbecue site.

The hinge alignment exterior to the support bar shown in FIG. 3B is utilized in the depiction of FIG. 4, which is a view in perspective of the base or ground support 17 into which the distal end of the support arm is placed immediately prior to set-up for barbecue grilling. A depression 18 is disposed in a hemi-spherical bead 19 physically attached on top of the pinnacle of the base 17 to hold the ball shaped ending 20 of the distal end of the support arm directly below the vertical support arm 21 of barbecue grill 10.

Figure 5:
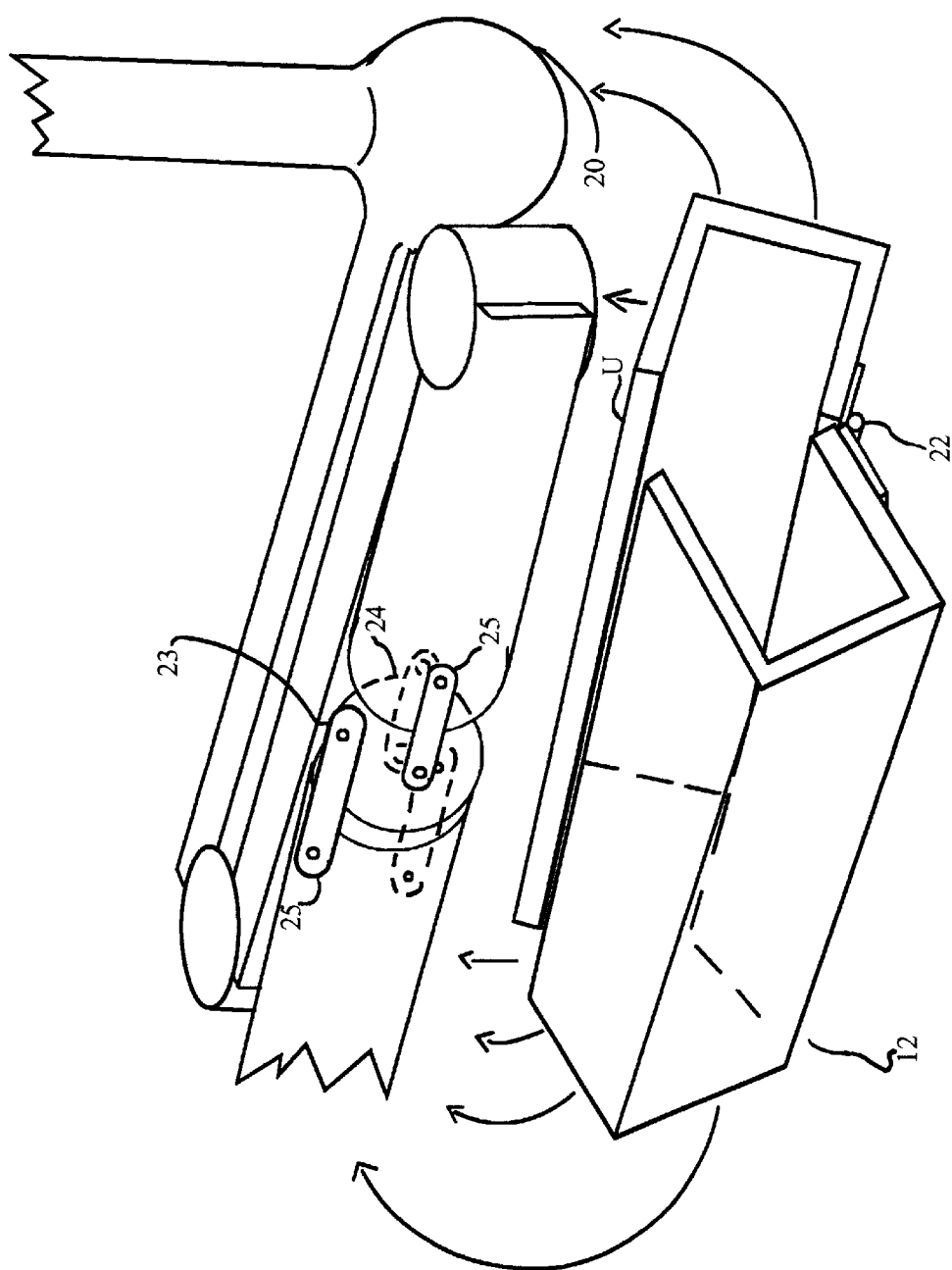
FIG. 5 is an enlarged view of FIG. 2 showing details of the removeable sleeve that encloses the folded or retracted support arm when towing the extendable/retractable grill and showing ball-joint coupling in the first and last sections or links of the extendable/retractable grill.
Figure 6:
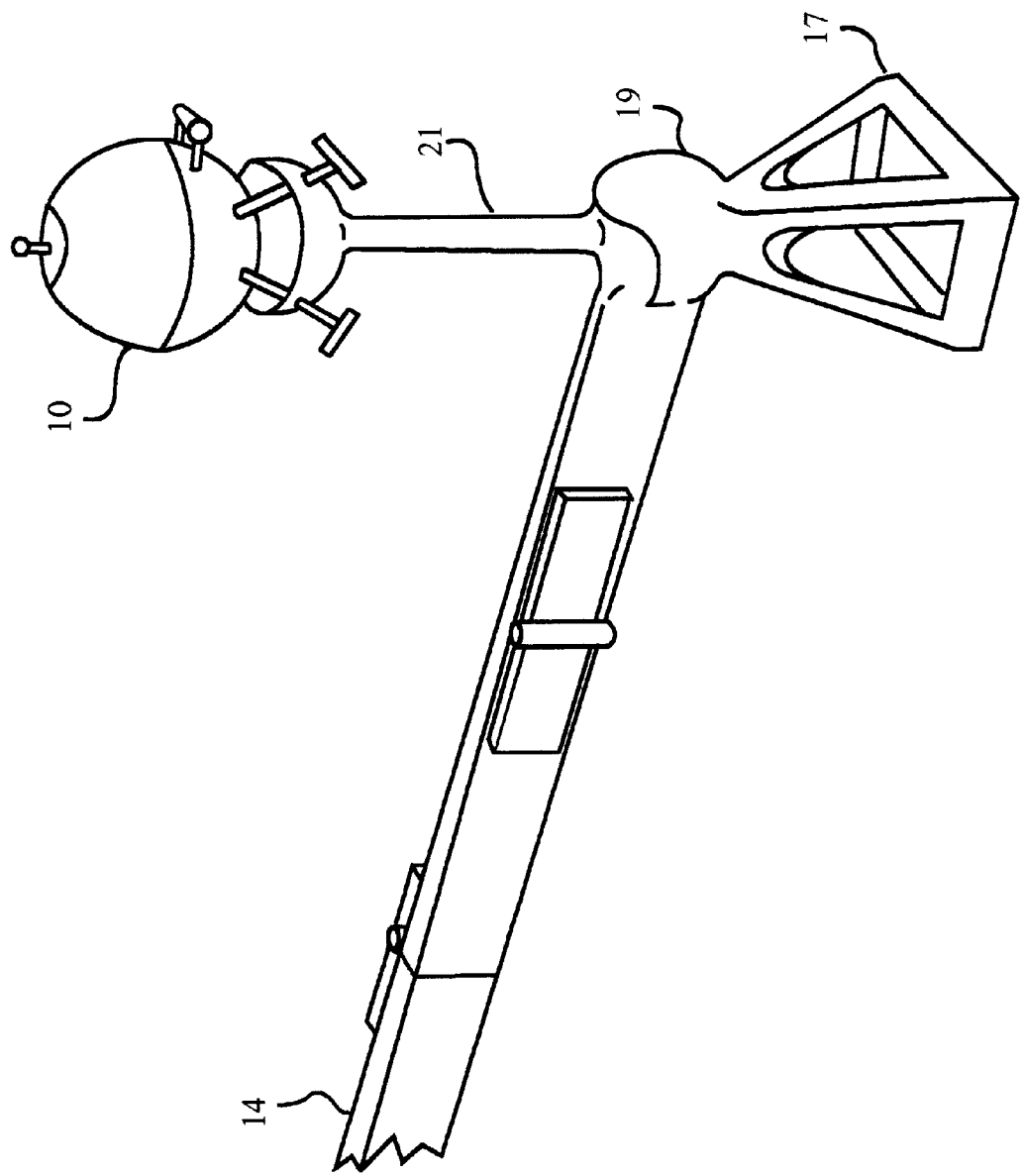
FIG. 6 is a view in perspective showing the extendable/retractable barbecue support arm resting in the base and the grill in a ready position for barbecuing.

The sleeve 12 that houses the support arm of the extendable/retractable barbecue grill, as shown in FIG. 5 may be of any shape; however, a rectangular shape is preferred, and the rectangle shaped sleeve may comprise two halves fixedly joined by a hinge 22. The hinged sleeve 12 may be held together by any conventional fastening means (not shown) at the unhinged point U of the sleeve. In order to ensure sufficient angular or rotary-type movement when the support arm is extended as in FIG. 1 or extended in rest upon the base as shown in FIG. 6, a universal coupling is used for the connection in the first link of the support arm attached to the trailer hitch and in the last link of the support arm at the distal end, as shown in FIG. 5. More specifically, the universal coupling is shown in the form of a ball joint 23, wherein the ball 24 is provided with four holes which engage with two pins 25, on each half of the coupling and wherein the pins of one half are set at 90° in relation to that of the other half.

The view in perspective of FIG. 6 shows the extendable/retractable barbecue support arm resting in the base 19 with the grill 10 in a ready position for barbecuing.

While the invention has been described with reference to specific embodiments, it is to be understood that the invention is not limited to the embodiments described above, but encompasses any equivalent means for providing the functions to enable preparation of foods by cooking or smoking over an open flame by better facilitating transportation and ultimate use of a barbecue grill transportable by a towing vehicle, and yet not requiring actual removal of the grill from the towing vehicle for barbecuing at the picnic or cook-out site.

I claim:

1. A vehicular trailer hitch, transportable, extendable/retractable barbecue grill for cooking while still connected to a towing vehicle, comprising:
    a) clamping means for attachment to a trailer hitch of a vehicle;
    b) a principle arm means to provide support for said barbecue grill having a first link to which said clamping means is fixed, said principle arm further comprising additional links hingedly attached to said first link to permit retraction of said principle arm from an extended position into a folded position insertable in a stabilizing sleeve;
    c) a universal coupling means connecting at least said first link of said principle arm to allow for arm misalignment and act as a shock absorber for transportation vibrations and jerks; and
    d) a distal end fixedly attached to a last link of said principle arm means to support a secondary arm on which said barbecue grill is mounted and to rest in repose in a base disposed on the ground in support of said principle and secondary arms of said barbecue grill.

2. The extendable/retractable barbecue grill of claim 1 wherein said universal coupling means connects the first and last links of the principal arm.

3. The extendable/retractable barbecue grill of claim 1 wherein all links of the principal arm are connected by universal couplings.

4. The extendable/retractable barbecue grill of claim 1 wherein said universal coupling means is a ball joint.

5. The extendable/retractable barbecue grill of claim 2 wherein said universal coupling means is a ball joint.

6. The extendable/retractable barbecue grill of claim 3 wherein said universal coupling means is a ball joint.

7. The extendable/retractable barbecue grill of claim 1 wherein said principle arm means to support said barbecue grill includes retracted or folded links.

8. The extendable/retractable barbecue grill of claim 7 wherein said retracted or folded links are housed in a sleeve.

9. The extendable/retractable barbecue grill of claim 2 wherein said principle arm means to support said barbecue grill includes retracted or folded links.

10. The extendable/retractable barbecue grill of claim 9 wherein said retracted or folded links are housed in a sleeve.

11. The extendable/retractable barbecue grill of claim 3 wherein said principle arm means to support said barbecue grill includes retracted or folded links.

12. The extendable/retractable barbecue grill of claim 11 wherein said retracted or folded links are housed in a sleeve.

* * * * *